United States Patent [19]
Kurita et al.

[11] Patent Number: 5,452,384
[45] Date of Patent: Sep. 19, 1995

[54] OPTICAL INTEGRATED LENSED CONNECTOR FOR FOCUSSING OBLIQUE INCIDENT LIGHT

[75] Inventors: Hasakazu Kurita; Shigeru Kawai, both of Tokyo, Japan

[73] Assignee: NEC Corporation, Japan

[21] Appl. No.: 176,203

[22] Filed: Jan. 3, 1994

[30] Foreign Application Priority Data

Jan. 8, 1993 [JP] Japan .................................. 5-001468

[51] Int. Cl.6 ........................... G02B 6/12; G02B 6/32
[52] U.S. Cl. ...................... 385/33; 385/14; 385/27; 385/31; 385/131; 359/721
[58] Field of Search ................ 385/14, 27, 28, 31, 385/33, 39, 47, 49, 88, 129, 130, 131, 132; 359/721

[56] References Cited

U.S. PATENT DOCUMENTS

| | | | |
|---|---|---|---|
| 4,887,255 | 12/1989 | Handa et al. | 385/31 X |
| 4,966,430 | 10/1990 | Weidel | 385/130 X |
| 5,031,991 | 7/1991 | Nakatsu et al. | 385/33 |
| 5,059,008 | 10/1991 | Flood et al. | 359/721 X |
| 5,101,454 | 3/1992 | Blonder et al. | 385/14 |
| 5,101,460 | 10/1990 | Richard | 385/37 |
| 5,132,843 | 7/1992 | Aoyama et al. | 385/37 X |
| 5,237,434 | 8/1993 | Feldman et al. | 385/37 X |
| 5,268,973 | 12/1993 | Jenevein | 385/130 X |

OTHER PUBLICATIONS

"Planar Integration of Free—Space Optical components", Jahns and Huang, *Applied Optics,* vol. 28, No. 9, 1 May 1989.

"Imaging with Planar Optical Systems", Jahns and Walker, *Optics Communications,* vol. 76, No. 5,6, 15 May 1990.

"Diffraction—Limited Blazed Reflection Diffractive microlenses for Oblique Incidence Fabricated by Electron—beam Lithography", Shiono and Ogawa, *Applied Optics, vol. 30, No. 25, 1 Sept. 1991.*

*Primary Examiner*—Brian Healy
*Attorney, Agent, or Firm*—Laff, Whitesel, Conte & Saret

[57] ABSTRACT

An optical connector comprises a series of transparent substrates 50–53 including a refraction type lens 10 embedded in the central substrate 50, two beam deflection elements 40 and 41 offset from the optical axis of the lens 10, a light emitting element 20 directly below the beam deflection element 40, and a light detecting element 30 directly above the beam deflection element 41. The lens 10 is designed to have identical meridional and sagittal focal lengths so that meridional and sagittal images of obliique incident beams may be formed on the same spot on the light detecting element 30. Beam of light emitted from the light emitting element 20 are deflected by the beam deflection element 40 and enters the lens 10 obliquely. The beams, passing through the lens 10 and the deflection element 41 are cllimated within a small spot on the light detecting element 30 since the lens 10 has identical meridional and sagittal focal lengths.

4 Claims, 2 Drawing Sheets

OPTICAL INTEGRATED LENSED CONNECTOR FOR FOCUSSING OBLIQUE INCIDENT LIGHT

FIELD OF THE INVENTION

The invention relates to an optical connector for use in high speed parallel data transfer, and more particularly to an optical connector utilizing a refractive lens suitable for optically connecting a light emitting element and a light detecting element within an electronic circuit, the optical connector being suitable in case where the two elements are spaced apart because of the layout of the circuit.

KNOWN ART

Extensive researches are in progress to develop a high speed computer capable of processing ever increasing information. However, it is often said that any computer based on conventional serial data processing architecture will soon reach its operational limit. Therefore, many of the recent researches are directed to develop a new computer architecture incorporating a multiplicity of processors which may quickly perform parallel data processing. Concurrently, in order to enhance parallel data transfer between elements, optical connections have been proposed for optically connecting circuit elements by means of light beams. Such optical connections have an advantage over conventional wiring methods in that light beams may propagate freely in space without any mutual interference. An example of an optical connection is described in detail in an article titled as "Planar Integration of Free Space Optical Components", Applied Optics, Vol. 28. No. 9, pp. 1062–1605, in which a planar array of optical elements are provided on transparent substrates. In this method, however, incident beams of light propagate in a transparent substrate and enter a collimating lens obliquely, i.e. enter the collimating lens at non-zero incident angles with respect to the optical axis of the lens, thereby resulting in third-order aberrations and hence a reduced light utilization factor (which factor is defined as the ratio of light energy available to an element located located on the optical axis to the total energy supplied by the incident beams of light.

A method was proposed to use a diffraction-type lens to compensate this disadvantageous third-order aberrations. This method is described in detail in articles titled as "Imaging with planar Optical Systems", Optics Communications, Vol. 76, No. 5, pp. 313–317; and "Diffraction-limited lenses for Incidence Fabricated by Electron beam Lithography", Applied Optics, Vol. 30, No. 25, pp. 3643–3649.

In these methods, the light utilization factor is improved by compensating third-order aberrations by a diffractive lens. Howeveer, the use of the diffractive lens induces strong wavelength dependency in the optical characteristics of the connectors, so that the source of the light must be monochromatic. Further, it is difficult to attain a high light utilization factor by a diffraction lens since manufacture of diffractive lenses having high diffraction efficiency is difficult.

SUMMARY OF THE INVENTION

In view of these conventional disadvantages mentioned above, it is an object of an invention to provide an optical connector having a high light utilization factor.

It is another object of the invention to provide an optical connector having little wavelength dependency in transferring data optical from one element to another.

According to one aspect of the invention, there is provided an optical connector including at least one transparent substrate and a multiplicity of optical elements each formed on either side of said transparent substrate, wherein one of the optical elements is a refraction type lens having meridional and sagittal focal lengths to focus meridional and sagittal images for oblique incident beams of light at one point in space.

With this refractive lens, the maximum diameter of a light spot may be minimized when the beams are focused on a light detecting element, preventing the beams from spreading out of the light detecting element or from being focused off the element, and thereby increasing the light utilization factor. It should be understood that the use of the lens decreases wavelength dependency of the optical connector in focussing beams of light.

According to another aspect of the invention, there is provided an optical connector including at least one transparent substrate and a multiplicity of optical elements each formed on either side of said transparent substrate, comprising: a reflective film formed on one side of said transparent substrate, and wherein one of the optical elements is a refractive lens embedded in said transparent substrate, said refractive lens having a flat surface flush with said one side of said transparent substrate facing the reflective film and having meridional and sagittal focal lengths so as to focus at one point in space oblique incident beams of light coming from the other side of said transparent substrate.

This construction has advantages in that, in addition to enhanced light utilization factor and reduced wavelength dependency of the optical connector as mentioned above in connection with the first aspect of the invention, both the light emitting and reception elements may be provided on the same side of the transparent substrate, thereby facilitating a simple layout of the circuit.

DETAILED DESCRIPTION OF THE PREFERRED EMBODIMENT

Figure 1:
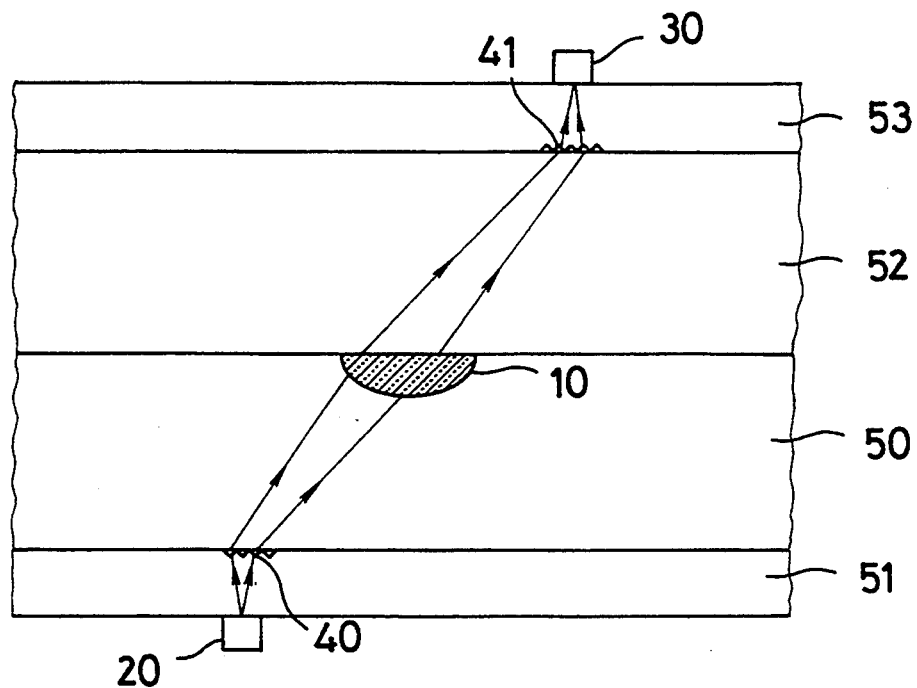
FIG. 1 is a vertical cross section of a first optical connector embodying the invention.
Figure 2:
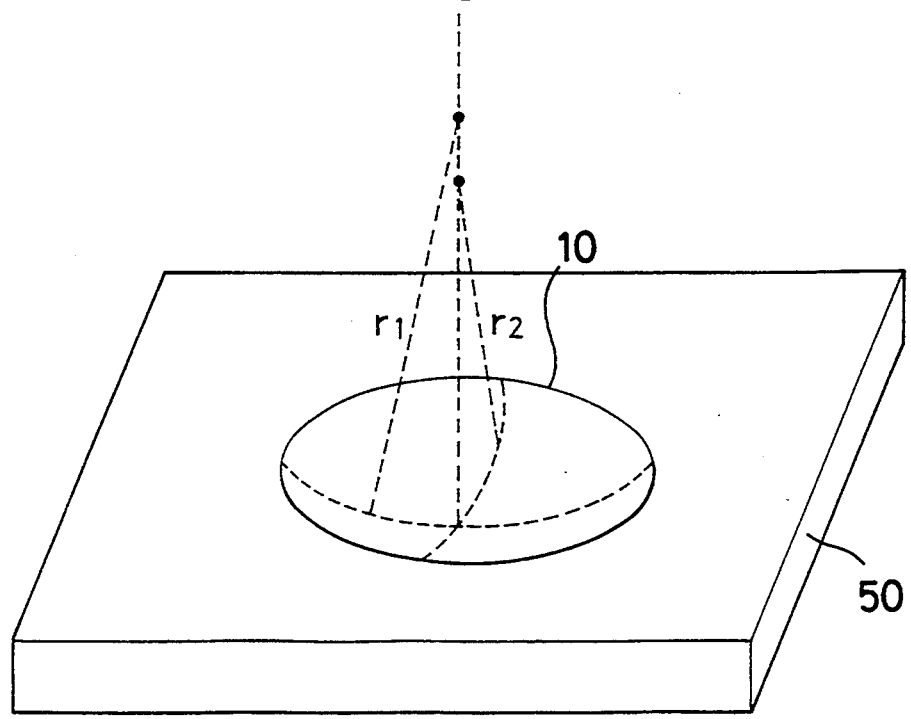
FIG. 2 is a perspective view of a refraction type lens for use in the optical connector of the invention.

FIG. 1 is a cross section of a first embodiment of an optical connector in accordance with the invention, showing a meridional cross section of a refraction type lens. As shown in the figure, the connector of the invention comprises a light emitting element 20, a first transparent substrate 51 having on one surface thereof a first beam deflection element 40 such as diffraction element, a second transparent substrate 50 having a refraction type lens 10 embedded in the substrate, a third transparent substrate 52, and a fourth transparent substrate 53 having on the lower side thereof a second beam deflection element 41, and a light detecting element 30 for receiving light beams. As shown in FIG. 2, the lens 10 may be formed by first making in the surface of the transparent substrate 50 a recess having a meridional and a sagittal radii r1 and r2 of curvature, respectively, and then filling the recess by a material such as GaAs having a higher index of refraction than the transparent substrate. The radii r1 and r2 may be calculated from a well known ray tracing method, such that meridional and sagittal images of oblique incident beams be formed on the same spot on the light detecting element 30.

In this construction of the optical connector, beams of light emitted from the light emitting element 20 into the transparent substrate 51 gradually diverges as it propagates through the transparent substrate 51, and are deflected by the beam deflection element 40. The beams directed by the deflection element 40 to the refraction type lens 10 through the transparent substrate 50 enters the lens 10 obliquely with respect to the optical axes of the lens 10, where the beam is collimated and directed to the beam deflection element 41 through the transparent substrate 52. The beam is deflected again by the deflection element 41 onto the light detecting element 30 located across the transparent substrate 53. Since the lens 10 is configured to have meridional and sagittal focal lengths to form meridional and sagittal images of the oblique beams on the face of the light detecting element 30, the maximum diameter of the spot or images of the beams formed on the light detecting element 30 may be sufficiently small and well within the light receiving area of the light detecting element 30, yielding a high light utilization factor. It should be noted that the use of the refraction type lens 10 reduces wavelength dependency of the optical connector in collimating the beams.

Figure 3:
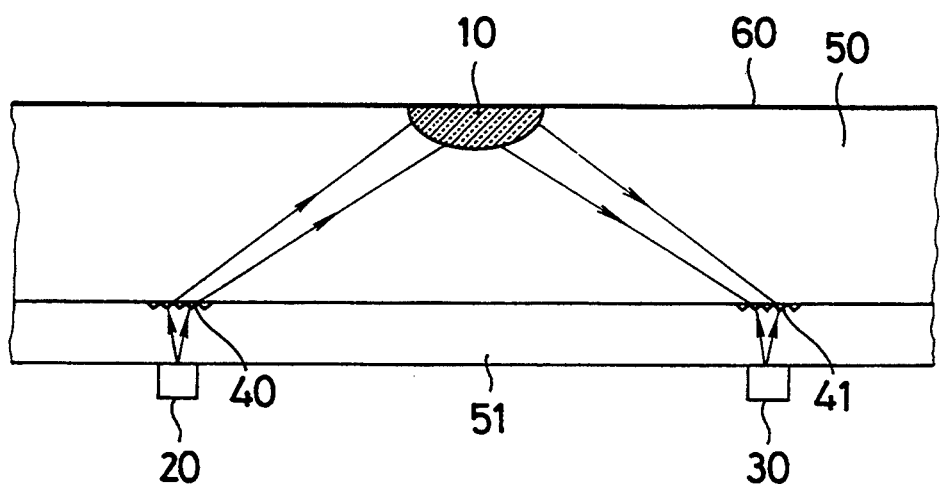
FIG. 3 is a vertical cross section of a second optical connector embodying the invention.

FIG. 3 is a cross section of a second optical connector of the invention. The cross section is taken along the meridional plane of a refractive lens. This optical connector comprises a light emitting element 20, a first transparent substrate 51 having on its upper face separate beam deflection elements 40 and 41, a second transparent substrate 50 having therein refraction lens 10 which is the same in construction as the lens described in the first example, a reflective film 60 covering the upper surface of the second transparent substrate and the flat surface of the lens 10, and a light detecting element 30 for receiving light routed from the light emitting element 20.

The optical connector having this construction may provide the same desirable functions as the first one discussed above. That is, a beam of light emitted from the light emitting element 20 into the transparent substrate 51 gradually diverges as they propagate in the substrate 51 and are first deflected by the beam deflection element 40 to the refraction type lens 10 through the transparent substrate. The beams entering the lens 10 obliquely are refracted by the lens 10 and reflected by the reflection film 60. The beam is again refracted or focused by the lens 10 and proceeds through the transparent substrate 50 to the beam deflection element 41, where the beams are deflected to the light detecting element 30. As in the first example described above, the lens 10 has its meridional and sagittal focal lengths such that the beams of light entering the lens obliquely may be focused on the light receiving face of the light detecting element 30 so as to form a well collimated small spot within the face. Thus, the optical connector may yields a high light utilization factor. The refractive lens 10 again reduces wavelength dependency of the optical connector.

It should be appreciated that in the second example electronic components may be advantageously arranged on the same side of a transparent substrate, thereby making it easy to connect the electrical components.

It would be understood from the foregoing description that the present invention may eliminate third-order aberrations for oblique beams of light caused by a conventional refraction lens having a single radius of curvature. In other words, although beams of light emitted from a light emitting element and passed to a light detecting element through transparent substrates are deflected by deflecting elements, and hence the beams are oblique to the focussing refractive lens, the present invention does not suffer from such third-order aberrations because the refraction lens has suitable meridional and sagittal radii of curvature for enabling the oblique beams of light to be focussed at the same spot in space.

As an example, if the angle of incidence to the lens is 30 and the angle of diversion is 5.7, the minimum diameter of the spot formed on the light detecting element is (1) 40 $\mu$m for a conventional collimating lens having a radius of curvature of 810 $\mu$m, and (2) no more than 4 $\mu$m for a collimating lens of this invention having meridional and sagittal radii of curvature of 986 $\mu$m and 733 $\mu$m, respectively. This manifests a merit of the invention over a conventional optical connector which uses a single refraction surface. It should be noted that the the merit of the invention becomes more significant for a larger angle of incidence.

What we claim is:

1. An optical connector including at least one transparent substrate and a multiplicity of optical elements each formed on either side of said transparent substrate, wherein
    one of said optical elements is a refraction type lens having meridional and sagittal focal lengths so as to focus oblique incident beams of light at one point in space.

2. An optical connector, comprising:
    a light emitting element;
    a first transparent substrate having a first side facing said light emitting element;
    a second transparent substrate placed on a second side of said first transparent substrate;
    a third transparent substrate placed on said second transparent substrate, and
    a fourth transparent substrate placed on said third transparent substrate;
    a first beam deflection element disposed between said first and second transparent substrates;
    a refraction type lens embedded between said second and third transparent substrates, said refraction lens having a flat surface facing said third transparent substrate and flush with said second transport substrate;
    a second beam deflection element disposed between said third and fourth transparent substrates;
    a light detecting element disposed on one side of said fourth transparent substrate opposite said second beam deflection element, wherein
    said refraction type lens has meridional and sagittal focal lengths such that meridional and sagittal images of oblique incident beams of light coming from said light emitting element are formed on the same spot of said light detecting element.

3. An optical connector including at least one transparent substrate and a multiplicity of optical elements each formed on either side of said transparent substrate, comprising:

a reflective film formed on one side of said transparent substrate, and wherein one of said optical elements is a refractive lens embedded in said transparent substrate and having a surface flush with said one side of said transparent substrate facing said reflective film, and said refractive lens having meridional and sagittal focal lengths such that meridional and sagittal images of oblique incident beams of light coming from the other side of said transparent substrate are formed at one point in space.

4. An optical connector, comprising:

a light emitting element;

a first transparent substrate having one side for bearing thereon said light emitting element, and another side having beam deflection elements;

a second transparent substrate placed on said another side of said first transparent substrate;

a refraction type lens embedded in said second transparent substrate and having a surface flush with one side of said second transparent substrate facing away from said beam deflection element; and a reflective film formed on said flush surfaces of said refractive lens and said second transparent substrate;

a light detecting element mounted on said one side of said first transparent substrate, wherein said refraction type lens has meridional and sagittal focal lengths such that meridional and sagittal images of oblique incident beams of light coming from said light emitting element are formed at one point in space.

* * * * *